United States Patent [19]
Barnes

[11] Patent Number: 6,089,246
[45] Date of Patent: Jul. 18, 2000

[54] UMBRELLA SUPPORT

[76] Inventor: John W. Barnes, 6730 Clinton Ave., Baton Rouge, La. 70805

[21] Appl. No.: 09/247,189

[22] Filed: Feb. 9, 1999

Related U.S. Application Data

[63] Continuation-in-part of application No. 08/909,992, Aug. 12, 1997, abandoned.

[51] Int. Cl.[7] .............................. F04H 15/06; B66F 3/08
[52] U.S. Cl. ...................... 135/88.06; 135/16; 135/909; 135/117; 248/514; 254/11; 254/84; 254/424
[58] Field of Search .............................. 135/88.01, 88.05, 135/88.06, 909, 114, 117, 119, 16; 248/514, 519, 520, 538, 188.6, 155; 254/2 R, 11, 84, 85, 424, 418

[56] References Cited

U.S. PATENT DOCUMENTS

| | | | |
|---|---|---|---|
| Re. 35,731 | 2/1998 | Latch | 248/535 |
| 400,191 | 3/1889 | Clark | 248/155 X |
| 2,189,010 | 2/1940 | Lewis | 254/11 |
| 2,519,364 | 8/1950 | Fredholm | 254/424 |
| 2,547,896 | 4/1951 | Wellen | 135/16 |
| 2,870,884 | 1/1959 | Mazur | 52/158 |
| 2,989,967 | 6/1961 | Lee | 135/88.13 |
| 4,452,018 | 6/1984 | Hill | 52/155 |
| 4,541,596 | 9/1985 | Price | 248/159 X |
| 4,556,200 | 12/1985 | Shoemaker | 254/424 |
| 4,605,030 | 8/1986 | Johnson | 135/117 |
| 4,655,236 | 4/1987 | Dorame et al. | 135/88.06 |
| 4,834,128 | 5/1989 | Burgess | 135/88.06 |
| 4,991,612 | 2/1991 | Kiss et al. | 135/88.05 |
| 5,207,406 | 5/1993 | Stine et al. | 248/406 X |
| 5,241,977 | 9/1993 | Flores et al. | 135/88.06 |
| 5,295,500 | 3/1994 | Leu | 135/114 X |
| 5,850,843 | 12/1998 | Mahood et al. | 135/88.06 |

FOREIGN PATENT DOCUMENTS

| 3127110 | 2/1983 | Germany | 135/909 |
|---|---|---|---|

*Primary Examiner*—Carl D. Friedman
*Assistant Examiner*—Winnie Yip
*Attorney, Agent, or Firm*—David L. Ray

[57] ABSTRACT

An apparatus for supporting an umbrella. The apparatus of the invention includes a base plate which is placed on the surface of the area in which the umbrella is desired, a hollow cylinder connected at its lower end to the base plate and extending upwardly therefrom for receipt and support of an umbrella shaft, and a jack for contacting the underside of a vehicle to place a downward force on the base plate.

5 Claims, 6 Drawing Sheets

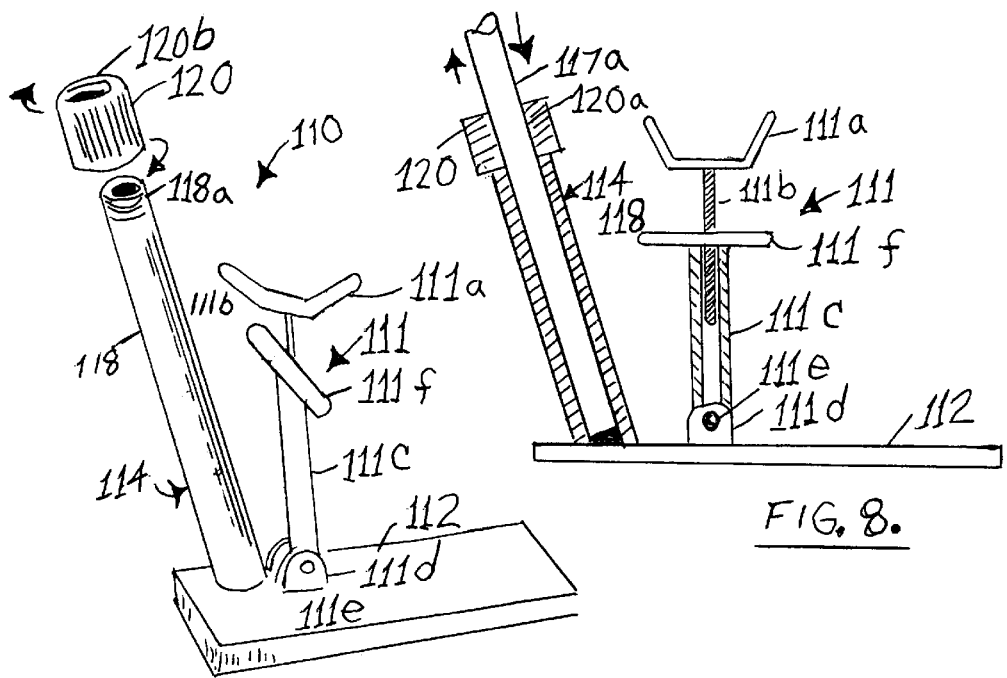
FIG. 7.
FIG. 8.
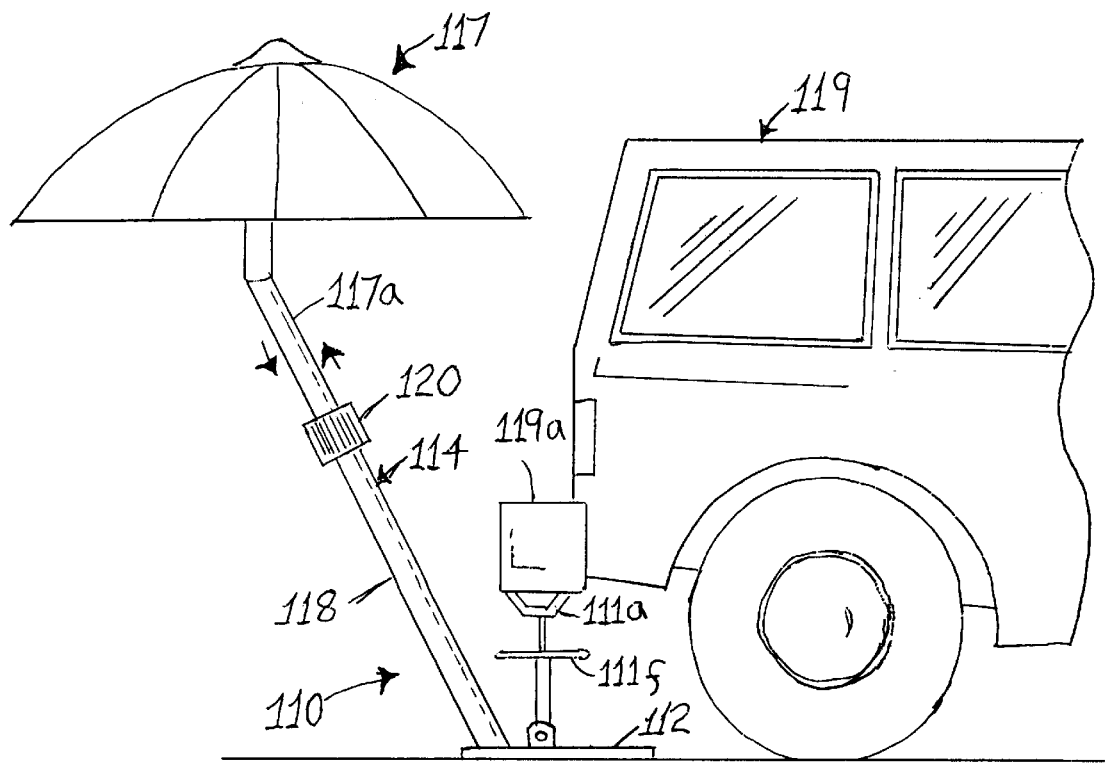
FIG. 9

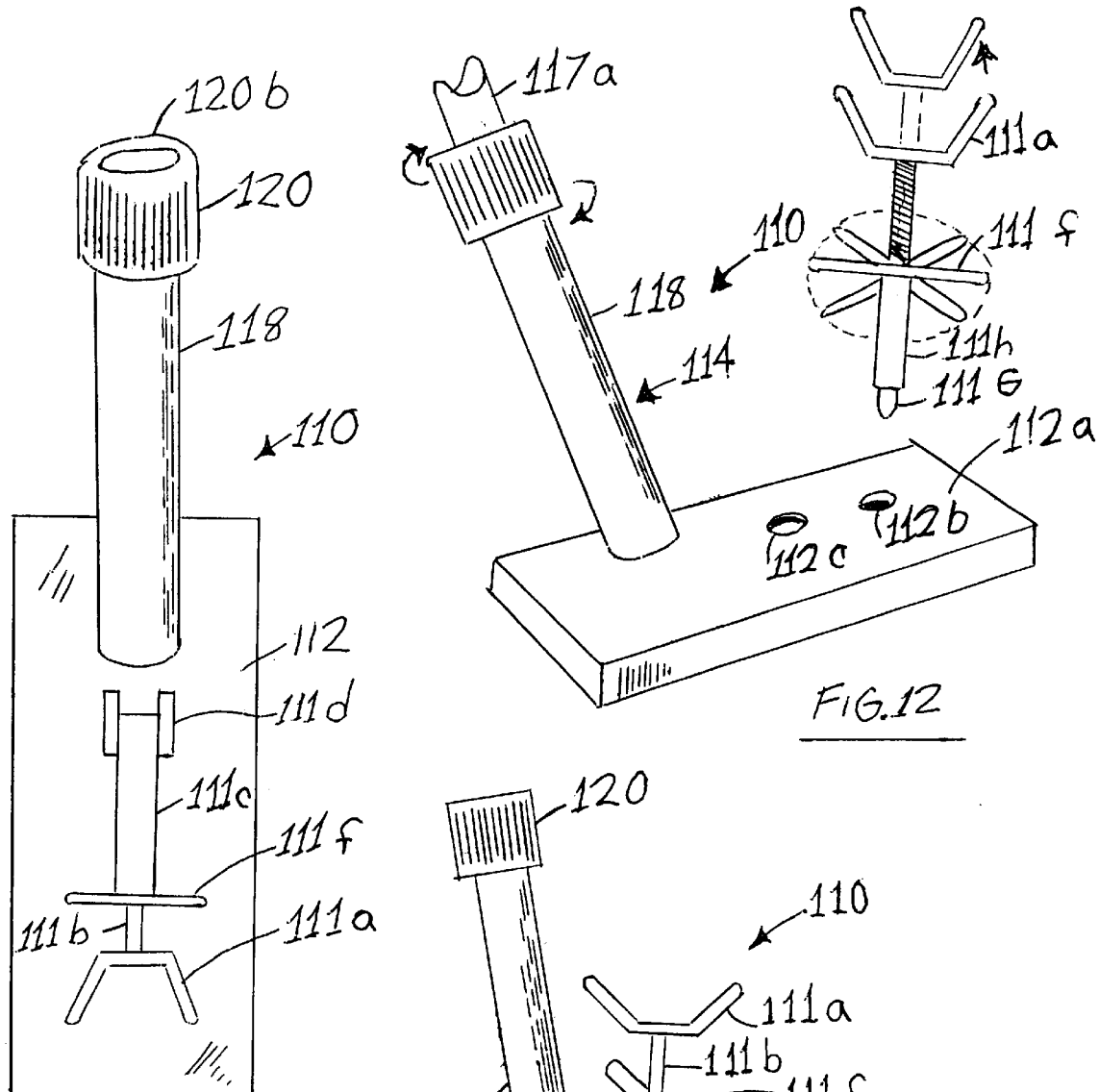
Fig 14
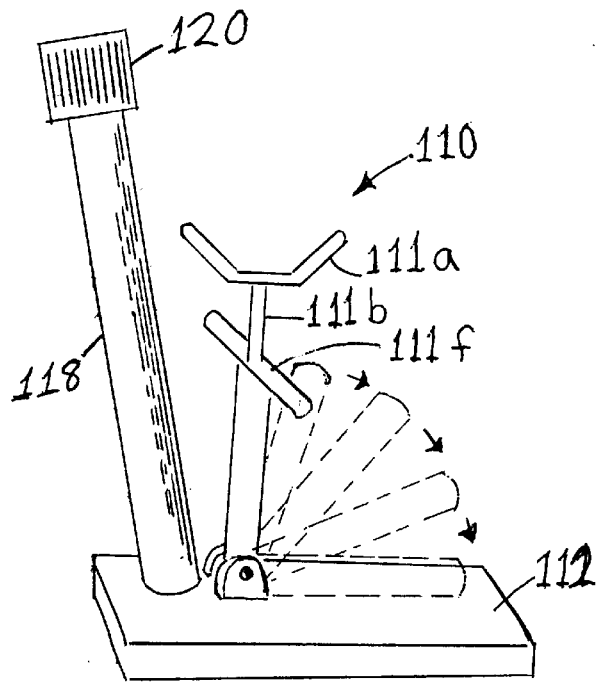
FIG.12
FIG.15

UMBRELLA SUPPORT

CROSS REFERENCE TO RELATED APPLICATIONS

This application is a continuation-in-part of my patent application Ser. No. 08/909,992, filed Aug. 12, 1997 now is abandoned.

BACKGROUND OF THE INVENTION

1. Field of the Invention

The present invention relates to umbrellas. More particular, the present invention relates to support devices for umbrellas which hold the umbrella in an upright position on the ground or other surfaces.

2. Description of the Related Art

It is common throughout the United States for some of the people attending sports events such as football games to come to the stadium parking lot prior to the game and have a "tailgate" party. At the tailgate party, food and beverages are generally served and the fans socialize prior to the football game or other sports event.

At such tailgate parties it is quite common for shade tents or canopies to be positioned near the vehicles in the parking lot or other area where the tailgating party is occurring. Such shade tents or canopies commonly require heavy anchors to support the tent or canopy posts in an upright or slightly tilted position, particularly if rain or wind is encountered. It is quite common for the tailgate party to occur on asphalt and thus the tent or canopy posts could not be forced into the asphalt for stability, but rather must have a portable support device to support the posts of the canopy or tent.

Some tables have a hole in the middle thereof for supporting an umbrella, but most tables used at tailgating parties do not have umbrella supporting devices. There is a need to provide stable support device for individual umbrellas to provide shade from the sun and shelter from the rain.

People at picnics commonly need protection from the sun and rain which can be provided by individually standing umbrellas with stable support devices. Roadside merchandise and vegetable stands also utilize umbrellas to shade their goods and protect them from the rain.

Exemplary of the Patents of the related art are the following U.S. Pat. Nos. 5,388,883; 5,385,161; 5,284,172; 5,150,278; 4,865,346; 4,807,920; and 4,154,254.

SUMMARY OF THE INVENTION

In accordance with the present invention there is provided an apparatus for supporting an umbrella. The apparatus of the invention includes a base plate which is placed on the surface of the area in which the umbrella is desired, and a hollow cylinder connected at its lower end to the base plate and extending upwardly therefrom for receipt and support of an umbrella shaft, the base plate having a jack which can be raised against the underside of the vehicle to hold the base plate in place; the pressure of the jack on the base plate holds the plate solidly on the ground or pavement on which the umbrella is to be located.

BRIEF DESCRIPTION OF THE DRAWINGS

FIG. 7 is a perspective exploded view of the second embodiment of the invention having a locking cap aligned for placement in the hollow cylinder of the umbrella support of the invention and a jack for placing under the bumper or other area of a motor vehicle;

FIG. 8 is a side cross sectional view of the embodiment of FIG. 1;

FIG. 9 is a partially cut away elevational view of the invention having the jack thereof placed underneath the bumper of a motor vehicle;

FIG. 12 is a partially cut away, partially exploded perspective view of alternate embodiment of the plate for the second embodiment of the invention;

FIG. 14 is a top view of the plate of the present invention whereby the jack is folded into a horizontal position;

FIG. 15 is a perspective view of the invention of FIG. 15 showing the jack folding into a horizontal position;

DESCRIPTION OF THE PREFERRED EMBODIMENTS

Figure 1:
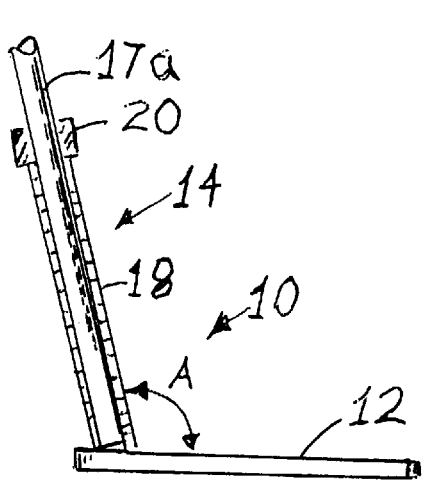
FIG. 1 is a side elevational view, partly cut away and partly in cross section, of the umbrella support of the invention showing the central shaft of an umbrella located in the hollow cylinder of the umbrella support.
Figure 2:
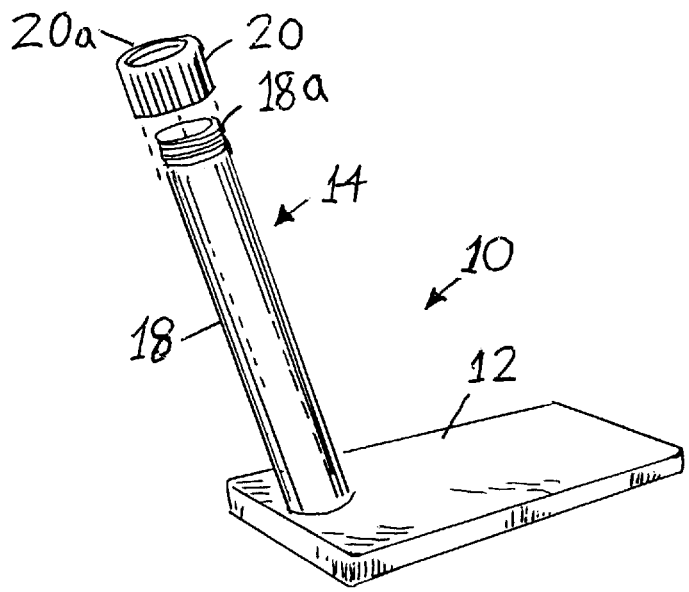
FIG. 2 is a perspective, exploded view of the invention having a locking cap aligned for placement in the hollow cylinder of the invention.
Figure 3:
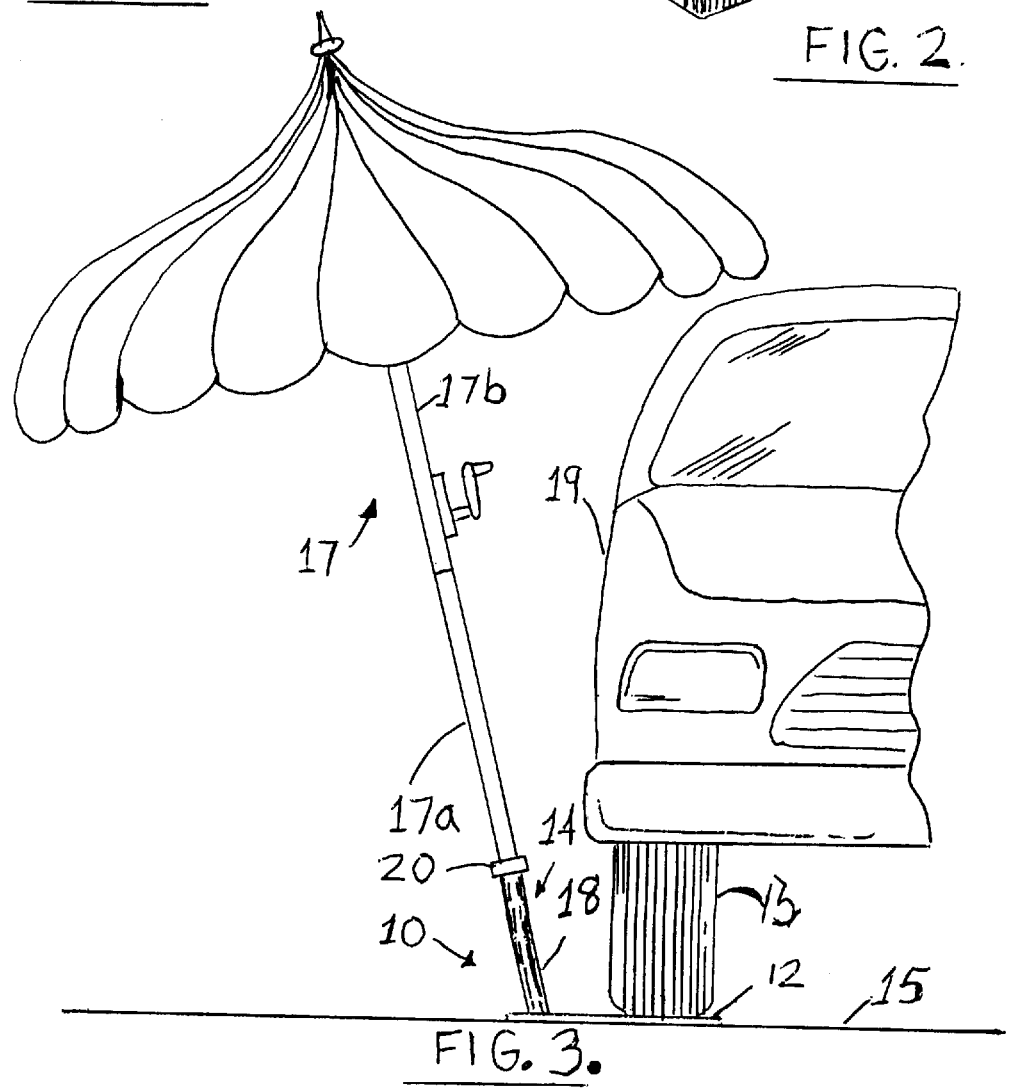
FIG. 3 is a partly cut away elevational view of the invention having a vehicle tire placed driven thereon and an umbrella placed therein.

Referring now to the drawings, in FIGS. 1 through 3 are shown a first embodiment of the umbrella support apparatus of the invention generally indicated by the numeral 10. Umbrella support 10 includes a base plate 12 and an upwardly extending umbrella support cylinder generally indicated by the numeral 14.

Base plate 12 is preferably generally rectangular in shape, although other shapes such as oval shape or circular shapes could be used. Preferably, plate 12 is made from a metal alloy such as steel or aluminum alloys, although high strength reinforced plastics may also be used if desired.

The size of plate 12 must be sufficient for plate 12 to extend underneath the vehicle tire 16 shown in FIG. 3 so that the tire may press downward upon plate 12 and anchor umbrella support 10 firmly to the ground or pavement 15.

The umbrella generally indicated by the numeral 17 in FIG. 3 has a conventional central shaft 17a and 17b, with central shaft 17a being received in umbrella support cylinder 14. Umbrella support 14 can be seen to include a rigid hollow cylinder 18 having threads 18a thereon for receipt of locking cap 20. Locking cap 20 has internal threads(not shown) therein for engaging and fastening cap 20 on hollow cylinder 18. As can be seen in FIG. 3, central shaft 17a of umbrella 17 is located inside of hollow cylinder 18 and held in place by threading cap 20 onto threads 18a after fitting shaft 17a through opening 20a. Opening 20a fits snugly against the outside of central shaft 17a to prevent central shaft 17a from wobbling inside of hollow cylinder 18. A plurality of caps 20 with openings with various desired diameters may be provided with umbrella stand 10.

As can be seen in FIG. 1, base plate 12 forms an angle "A" with hollow cylinder 18. Angle A may range from about 90 degrees to 120 degrees. In the embodiments shown in FIGS. 1 through 3, angle A is approximately 105 degrees. If angle A were selected to be 90 degrees, plate 12 would have to be made larger so that the umbrella support 14 would be further away from tire 16 than is shown in FIG. 3 because the vertical central shaft 17a and 17b would strike the vehicle 19.

Figure 4:
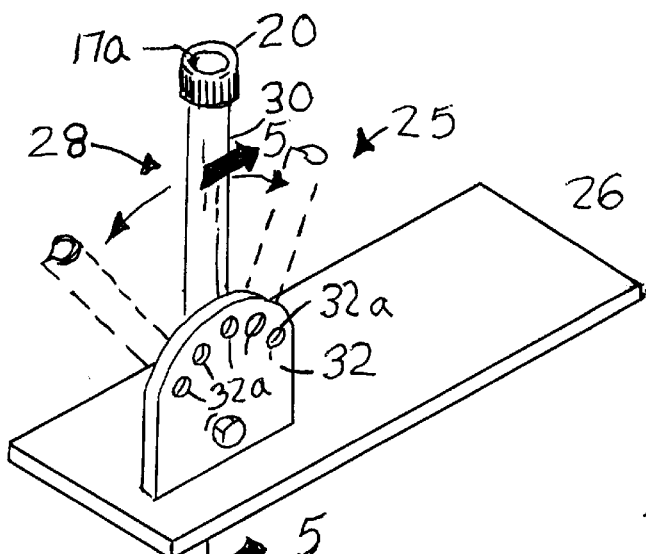
FIG. 4 is a perspective view of a second embodiment of the umbrella support of the invention.
Figure 5:
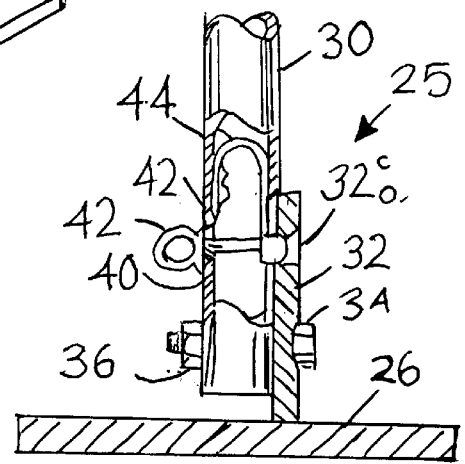
FIG. 5 is an partly cut-away, partly cross-sectional view taken along lines 5—5 of FIG. 4 showing details of the locking mechanism of the stand.
Figure 5A:
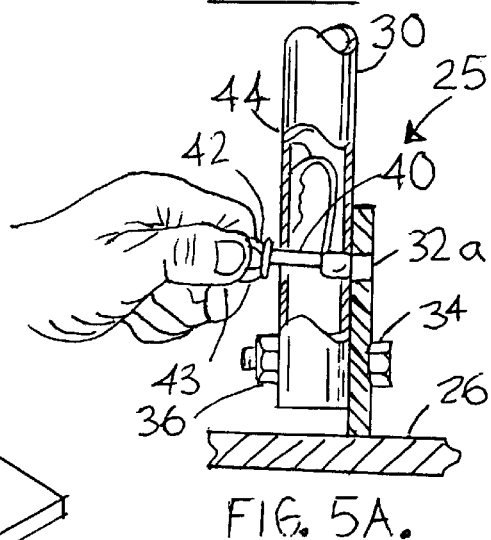
FIG. 5a is a partly cut-away, partly cross-sectional view taken along lines 5—5 of FIG. 4 showing the locking mechanism released.

Referring now to FIGS. 4, 5, and 5a, the second embodiment is generally indicated by the numeral 25. The second embodiment 25 includes a base plate 26 which is generally rectangular in shape and has a length greater than the base plate 12 of the embodiment shown in FIGS. 1 through 3 so that the umbrella support generally indicated by the numeral 28 would be far enough away from the vehicle tire 16 to enable the hollow cylinder 30 to be placed in a vertical position or to be tilted toward the vehicle 19.

Umbrella support 28 includes a rigid hollow cylinder 30 which is threaded (not shown) on the top similar to umbrella support 14. Cap 20, which is identical to the cap 20 shown in FIG. 2, is threaded onto hollow cylinder 30 to support an umbrella shaft such as shaft 1.

Extending vertically upwardly from plate 26 is an adjustment plate 32 which has a plurality holes 32a therein for adjusting the angle of hollow cylinder 30 relative to base plate 26. The bottom end of hollow cylinder 30 is rotatable connected to adjustment plate 32 by bolt 34 and nut 36. Bolt 34 extends through plate 32 and through the base of umbrella support 28. Bolt 34 is held in place by nut 36. Nut 36 is tightened snug against hollow cylinder 30.

As shown in FIGS. 5 and 5a, hollow cylinder 30 is held in position by pin 40 which extends through the hole 42 in hollow cylinder 30 and fits into hole 32a in plate 32. Preferably pin 40 is formed integrally with spring 44. Spring 44 can be seen in FIG. 5a to be connected to the inside of hollow cylinder 30 at one end and to have pin 40 integrally formed therewith at the other end.

To change the position of hollow cylinder 30 to the position shown in phantom lines, pin 40 can be removed from opening 32a as shown in FIG. 5a by grasping the ring 42 thereon with the fingers 43 and pulling pin 40 away from hole 32a. Hollow cylinder 30 may then be rotated to the positions shown in phantom lines or any other immediate position, and pin 40 is released to enter hole 32a.

Figure 6:
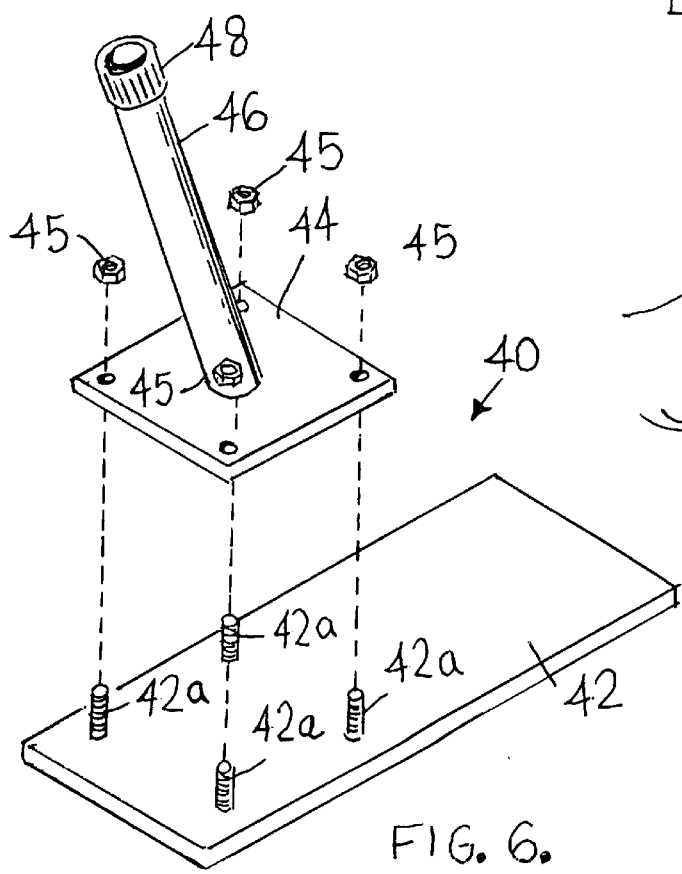
FIG. 6 is a perspective view of the third embodiment of the invention.

In FIG. 6 is shown a third embodiment of the invention generally indicated by the numeral 40. Base plate 42 has four threaded studs, 42a—42a extending upwardly therefrom. Studs 42a are received in plate 44. Plate 44 has a plurality of openings for receipt of studs 42a. Nuts 45—45 are threaded on to studs 42a to fasten plate 44 to base plate 42. Plate 44 has hollow cylinder 46 and cap 48 connected thereto, which are identical to the hollow cylinder 18 and cap 20 shown in FIGS. 1–3. Plate 44 can be rotated to change the position of the umbrella by removing the nuts from studs 42a and turning plate 44 to a new position.

If desired, locking caps 20 and 48 could be eliminated. Umbrella shaft 17a would then be placed in the hollow cylinders 18, 30, or 46 without using locking caps 20 or 48. Furthermore, if desired, a pin could be placed through holes drilled in hollow cylinders 18, 30 and 46 and through holes drilled in shaft 17a to prevent shaft 17a from being removed from hollow cylinders 18, 30, or 48 without removal of the pin.

The umbrella support apparatus 10 of the invention thus provides a stable support for a single umbrella or multiple umbrellas wherever a vehicle may be located. To use the umbrella support 10 to support an umbrella, the base plate 12 of umbrella support 10 is placed in the front or rear of a vehicle tire 16 with the hollow support cylinder 20 being positioned to the outside of the vehicle a distance sufficient to support an umbrella without the umbrella shaft 17a striking the vehicle 19. The vehicle 19 is then moved or driven forward or in reverse until tire 16 is rolled onto base plate 12 to firmly anchor umbrella support 10 to surface 15. An umbrella such as umbrella 17 may be connected thereto by placing umbrella shaft 17a in hollow cylinder 18, the same method would be followed to use umbrella support 40. The same method would be followed to use umbrella support 25 to support an umbrella, except that hollow cylinder 30 could be rotated to a desired position before, or after, a vehicle tire is placed thereon.

The fourth embodiment of the invention is shown in FIGS. 7–17 and is generally indicated by the numeral 110. Umbrella support 110 includes a base plate 112, an upwardly extending umbrella support cylinder generally indicated by the numeral 114, and a jack generally indicated by the numeral 111.

Base plate 112 is generally rectangular in shape, although other shapes such as an oval shape or circular shape could be used. Preferably, base plate 112 is made from a metal alloy such as steel or aluminum alloys, although high strength reinforced plastics may also be used if desired.

The umbrella generally indicated by the numeral 117 in FIG. 9 has a conventional central shaft 117a, with central shaft 117a being received in the umbrella support cylinder generally indicated 114. Umbrella support cylinder 114 can be seen to be a rigid hollow cylinder 118 having threads 118a thereon as shown in FIG. 7 for receipt of locking cap 120. Locking cap 120 has internal threads 120a therein as shown in FIG. 8 for engaging and fastening cap 120 on hollow cylinder 118.

As can be seen in FIG. 9 central shaft 117a of umbrella 117 is placed inside of hollow cylinder 118 and is held in place by threading cap 120 onto threads 118a after fitting shaft 117 through opening 120b of cap 120. Opening 120a fits snugly against the outside of central shaft 117 to prevent central shaft 117a from wobbling inside of hollow cylinder 118. A plurality of caps 120 with opening with various diameters may be provided with umbrella stand 110.

Figure 13:
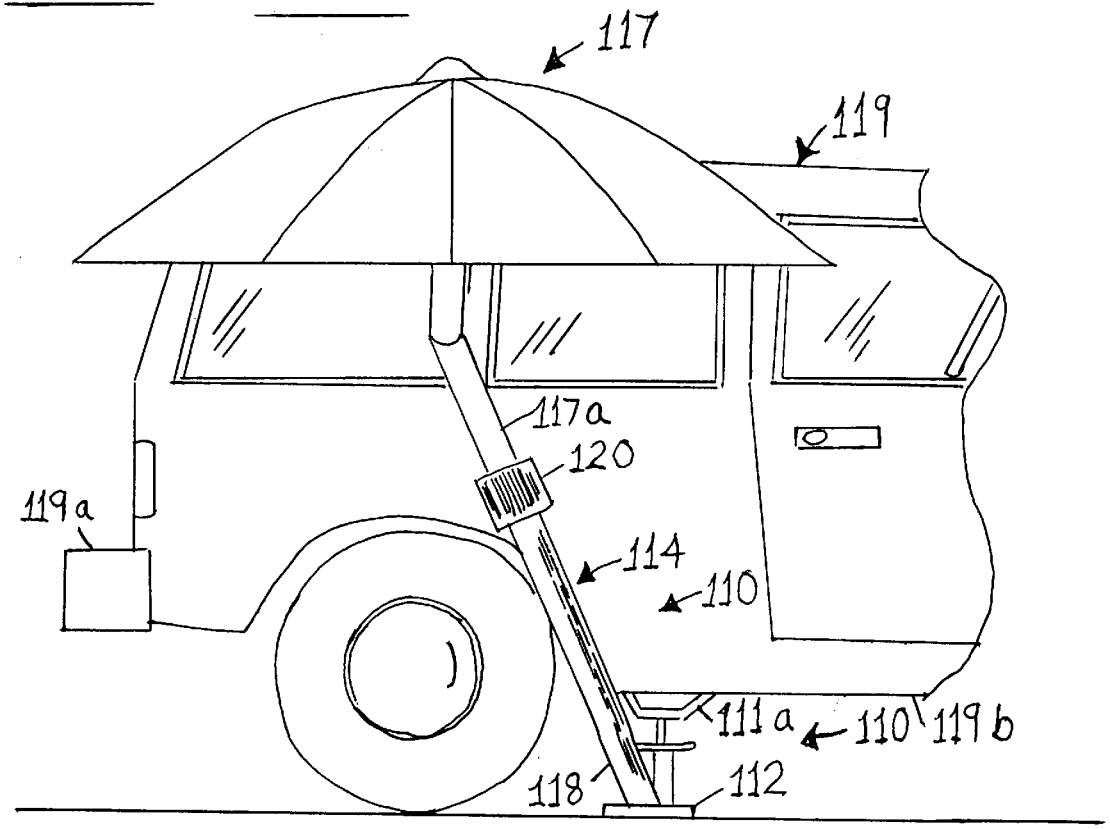
FIG. 13 is a partially cut away elevational view of the second embodiment of the invention wherein the jack is placed against the underside of a vehicle.

Jack 111 includes a upper vehicle contact member 111a which has rigidly connected thereto a threaded rod 111b. Threaded rod 111b is received in internally threaded cylinder 111c which rotatable connected at its bottom end to bracket 111d by pin 111e. Bracket 111d is rigidly connected to plate 112 by welding or the like. Rigidly connected to threaded rod 111b is turning member 111f which may be used to rotate rod 111b as can be seen in FIGS. 9 and 13 to force contact member 111a into contact with the bumper or underside of vehicle 119. To utilize umbrella support 110 with a vehicle such as vehicle 119 shown in FIGS. 9 and 13, the base plate 112 of the umbrella support 110 is placed beneath vehicle 119 so that the jack 111 can be aligned with the bumper as shown in FIG. 9 of the vehicle or the undercarriage of the vehicle as shown in FIG. 13. The turning member 111f is then rotated to cause the contact member 111a to contact the bumper 119a of vehicle 119 as shown in FIG. 9 or the under carriage 119b as shown in FIG. 13.

Figures 10, 11:
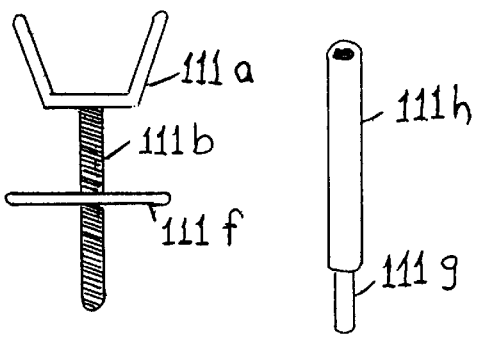
FIG. 10 is an elevational of the threaded rod turning handle and support member of the second embodiment of the invention.
FIG. 11 is a plan view of an elongated internally threaded holder having an insert portion for fitting into the plate upon which the jack is held.

In FIGS. 11 and 12 is shown an alternate embodiment of the base plate generally indicated by the numeral 112a. In base plate 112a is located a cylindrical hole 112b adapted to receive the lower portion 111g of post 111h. An alternate hole 112c may also be provided for locating post 111h closer to umbrella support post 114.

Figure 16:
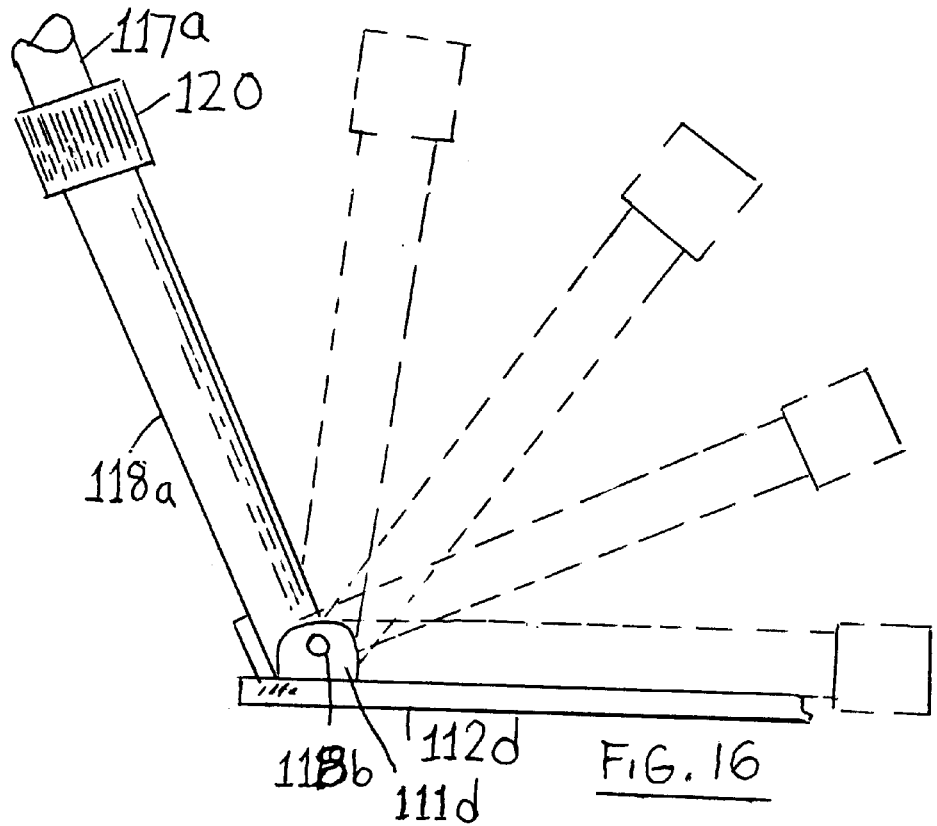
FIG. 16 is an alternate embodiment of the plate of the invention whereby the rigid hollow cylinder supporting the umbrella is fordable from an angular position to a horizontal position.
Figure 17:
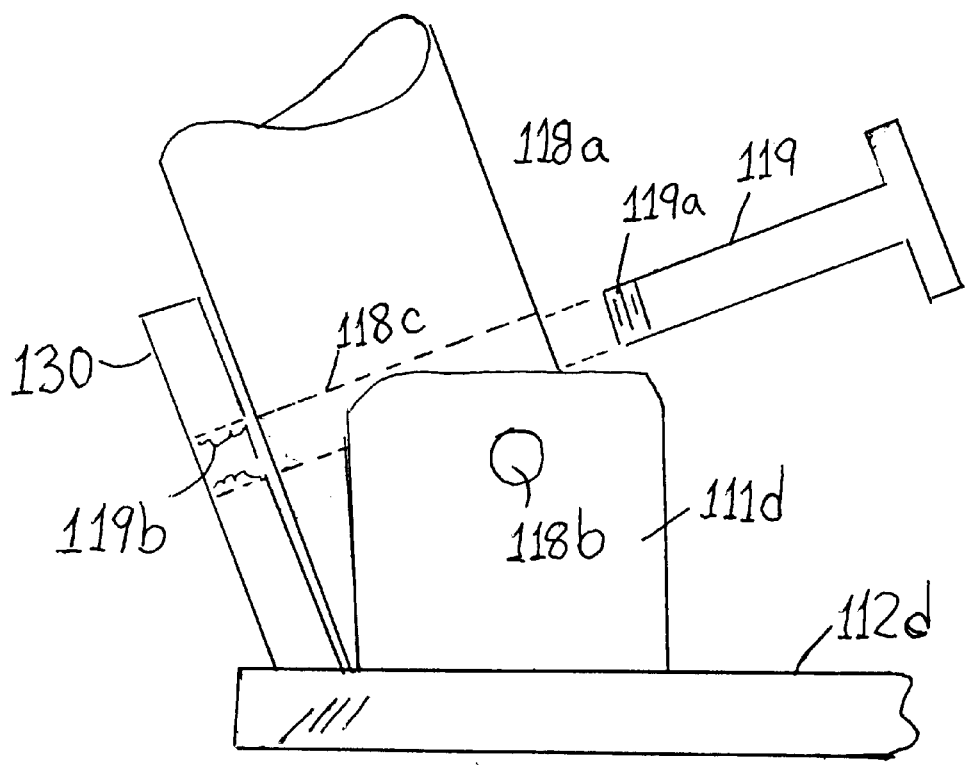
FIG. 17 is a detailed view of the embodiment of the invention FIG. 16 showing a threaded pin for holding the hollow cylinder supporting the umbrella in a fixed position.

In FIG. 16 is shown an alternate embodiment 112d of the base plate of the invention. Hollow cylinder 118a is pinned by pin 118b to bracket 111b which is rigidly connected to plate 112d. As can be seen in FIG. 17, hollow cylinder 118a has a hole 118c shown in dotted lines in FIG. 17 for receipt of a pin 119 shown in FIG. 17. Pin 119 has threads 119a thereon which are received in threaded slot 119b in holding plate 130. Holding plate 130 is rigidly connected to base plate 112d by welding or the like.

The apparatus and method of the invention allow umbrellas to be put into use quickly and easily with a minimum of effort. Furthermore, the apparatus of the invention is lightweight and is small in size for easy storage.

If desired, an umbrella support 10 and/or 25 and/or 40 and/or 110 or could be used at more than one wheel of the vehicle 19 or 119. Furthermore, the umbrella support of the invention could be used with vehicles such as trailers.

The umbrellas used with the umbrella support apparatus of the invention may be colored as desired. Preferably, where umbrellas are used at tailgating parties, the umbrellas could be decorated with the colors and/or the mascot of the team that the persons attending the parties support.

Although the preferred embodiments of the invention have been described in detail above, it should be understood that the invention is in no sense limited thereby, and its scope is to be determined by that of the following claims:

What is claimed is:

1. An apparatus for supporting an umbrella comprising:

a. a base plate which is placed on the surface of the area in which the umbrella is desired, b. a hollow cylinder connected to said base plate, said hollow cylinder extending upward therefrom for receipt and support of an umbrella shaft, and c. a jack connected to said base plate for contacting a portion of a vehicle to place a downward force on said base plate.

2. The apparatus of claim 1 wherein said base plate is rectangular in shape.

3. The apparatus of claim 1 wherein said base plate forms an angle with said hollow cylinder ranging from about 90 degrees to 120 degrees.

4. The apparatus of claim 1 wherein said hollow cylinder has a cap connectable to the upper end thereof for snug receipt of the central shaft of an umbrella.

5. The apparatus of claim 1 wherein said hollow cylinder is rotatably connected to an adjustment plate, said adjustment plate being rigidly connected to said base plate and extending upward therefrom.

* * * * *